United States Patent
Plüss et al.

(10) Patent No.: US 10,735,917 B2
(45) Date of Patent: Aug. 4, 2020

(54) ELECTRONIC ACCESS CONTROL APPLYING AN INTERMEDIATE

(71) Applicant: LEGIC Identsystems AG, Wetzikon (CH)

(72) Inventors: Marcel Plüss, Tann (CH); Peter Plüss, Tann (CH); Michael Würth, Winterthur (CH)

(73) Assignee: LEGIC IDENTSYSTEMS AG (CH)

( * ) Notice: Subject to any disclaimer, the term of this patent is extended or adjusted under 35 U.S.C. 154(b) by 216 days.

(21) Appl. No.: 15/746,148

(22) PCT Filed: Jun. 23, 2016

(86) PCT No.: PCT/EP2016/064570
§ 371 (c)(1),
(2) Date: Jan. 19, 2018

(87) PCT Pub. No.: WO2017/012819
PCT Pub. Date: Jan. 26, 2017

(65) Prior Publication Data
US 2018/0213370 A1   Jul. 26, 2018

(30) Foreign Application Priority Data

Jul. 23, 2015   (CH) ...................... 1078/15

(51) Int. Cl.
*H04L 29/06*    (2006.01)
*H04W 4/12*    (2009.01)
(Continued)

(52) U.S. Cl.
CPC .......... *H04W 4/12* (2013.01); *G07C 9/00174* (2013.01); *G07C 9/00309* (2013.01);
(Continued)

(58) Field of Classification Search
CPC ...................................................... H04W 4/12
See application file for complete search history.

(56) References Cited

U.S. PATENT DOCUMENTS 6,327,479 B1 * 12/2001 Mikkola ................. H04W 4/12
340/10.1
8,769,260 B1 * 7/2014 Kwan ..................... G06F 21/00
709/206
(Continued)

FOREIGN PATENT DOCUMENTS

EP    1 723 575 B1    10/2011
EP    2 437 403 A1    4/2012
(Continued)

OTHER PUBLICATIONS

International Search Report dated Sep. 7, 2016 in corresponding PCT International Application No. PCT/EP2016/064570.
(Continued)

*Primary Examiner* — Shawnchoy Rahman
(74) *Attorney, Agent, or Firm* — Ostrolenk Faber LLP

(57) ABSTRACT

A method of communicating between a terminal device and a back-end system assigned to the terminal device, the terminal device receives via a direct wireless communication link an authorization code from the mobile communication device. Responsive to receiving the authorization code, the terminal device transmits via the direct wireless communication link to the mobile communication device a terminal report message which includes a message content part and a message addressing part. The mobile communication device transmits the terminal report message in a forwarding message via a telecommunications network to a remote message processing system determined by the addressing part. The remote message processing system determines from the addressing part the back-end system
(Continued)

assigned to the electronic terminal device and transfers the content part of the terminal report message to the back-end system.

18 Claims, 4 Drawing Sheets

(51) Int. Cl.
| | |
|---|---|
| *H04W 4/80* | (2018.01) |
| *H04W 12/06* | (2009.01) |
| *G07C 9/00* | (2020.01) |
| *H04L 9/08* | (2006.01) |
| *H04W 12/08* | (2009.01) |
| *H04W 88/04* | (2009.01) |
| *H04W 76/14* | (2018.01) |

(52) U.S. Cl.
CPC .............. *H04L 9/088* (2013.01); *H04W 4/80* (2018.02); *H04W 12/06* (2013.01); *H04W 12/08* (2013.01); *G07C 9/00904* (2013.01); *H04W 76/14* (2018.02); *H04W 88/04* (2013.01)

(56) References Cited

U.S. PATENT DOCUMENTS

| | | | |
|---|---|---|---|
| 2006/0280181 A1 | 12/2006 | Brailas et al. | 370/392 |
| 2012/0115542 A1 | 5/2012 | Griffin et al. | 455/552.1 |
| 2012/0154115 A1 | 6/2012 | Herrala | 340/5.64 |
| 2013/0229259 A1* | 9/2013 | Huang | G07C 9/00563 340/5.52 |
| 2014/0049361 A1 | 2/2014 | Ahearn et al. | 340/5.7 |
| 2015/0082427 A1* | 3/2015 | Ivanchykhin | H04L 63/08 726/22 |
| 2015/0089214 A1* | 3/2015 | Dupre | H04L 9/3263 713/155 |
| 2018/0070291 A1* | 3/2018 | Breaux | H04W 4/33 |
| 2018/0375815 A1* | 12/2018 | Dinardo, Sr. | H04W 4/21 |

FOREIGN PATENT DOCUMENTS

| | | |
|---|---|---|
| FR | 2 981 823 A1 | 4/2013 |
| WO | WO 2008/069626 A1 | 6/2008 |

OTHER PUBLICATIONS

Written Opinion dated Sep. 7, 2016 in corresponding PCT International Application No. PCT/EP2016/064570.

* cited by examiner

ELECTRONIC ACCESS CONTROL APPLYING AN INTERMEDIATE

CROSS-REFERENCE TO RELATED APPLICATIONS

The present application is a 35 U.S.C. §§ 371 national phase conversion of PCT/EP2016/064570, filed Jun. 23, 2016, which claims priority to Swiss Patent Application No. 1078/15, filed Jul. 23, 2015, the contents of which are incorporated herein by reference. The PCT International Application was published in the English language.

FIELD OF THE INVENTION

The present invention relates to an electronic terminal device, a mobile communication device, and a method of communicating between an electronic terminal device and a back-end system. Specifically, the present invention relates to an electronic terminal device comprising a radio communication module for bidirectional wireless data exchange with a mobile communication device over a direct wireless communication link, a mobile communication device comprising a telecommunication module for communication with remote computer systems and a radio communication module for bidirectional wireless data exchange over the direct wireless communication link, and a method of communicating between the electronic terminal device and a back-end system assigned to the electronic terminal device.

BACKGROUND OF THE INVENTION

For many years, electronic terminal devices included in access control systems have been used in connection with passive RFID transponders (Radio Frequency Identifier). The electronic terminal devices included RFID readers for reading in a wireless fashion access rights or at least user identifiers from RFID transponders to control access to an access controlled area, such as a building or a room, or to access controlled objects, such as a car or goods in a vending machine, etc. With the arrival of mobile radio phones (cellular phones) that included active RFID-based communication interfaces, so called NFC interfaces (Near Field Communication), it became possible to use such mobile phones as carriers of access rights rather than passive REID transponders in form of RFID cards, dongles, or the like. With an NFC interface, it is possible to tie access control to the physical presence of the mobile phone in an area that is near a corresponding NFC interface of an access control device, e.g. attached to or close to a door or a gate. In other words, the short communication range of NFC interfaces requires that a user's mobile phone does not have to great a distance from the door or gate that is to be accessed, making it unlikely that an unauthorized person gets given access erroneously on the basis of access rights stored on the rightful user's mobile phone, as long as the mobile phone is in the possession of the rightful user. In addition to the mobile radio communication modules used for accessing cellular telephone networks such as GSM (Global System for Mobile Communication) or UMTS (Universal Mobile Telephone System), at least some types and brands of mobile phones include other radio-based communication modules for establishing local or direct wireless communication links. For example, such radio-based communication modules include WLAN (Wireless Local Area Network) and Bluetooth communication interfaces which have a much larger communication range than NFC interfaces, e.g. ten to a hundred meters.

FR 2981823 describes a method for authenticating identification device with respect to an actuator device integrated in car for carrying out car a start-up operation. In an authentication session, the identification device us authenticated by exchanging authentication data between the identification device and the actuator device. During an authentication session, a first part of the exchanging authentication data is communicated using Bluetooth, while a second part of the authentication data is exchanged through magnetic induction. In the actuator the two parts of authentication data are aggregated.

US 2012/154115 describes a method for controlling access in a location tracking system. When a mobile tag enters a room, it carries out location update procedures and becomes linked to a node of the location tracking system and updates its location in the room. In response to the location update, a location tracking apparatus of the location tracking system transmits an activation signal to an access control apparatus in the room to initiate establishment of a communication connection with the mobile tag so as to negotiate about access rights of the mobile tag. In an embodiment, the access control apparatus may be provided with a proximity sensor which, subsequently to negotiating the access rights, detects the close proximity of the mobile tag, before the access control apparatus actually grants or denies access.

US 2014/049361 describes an electronic system which includes a mobile communication device that communicates with a reader device associated with an electronic lock. The mobile communication device and the reader device communicate with each other, e.g. via Bluetooth, and exchange credentials, secure data, and location information. In an embodiment, the electronic lock may also include a close proximity range capability which automatically unlocks the electronic lock when a mobile communication device with appropriate credentials is within the close proximity range.

Both operators and users of access control systems welcomed the provision of mobile communication devices with radio-based communication modules for establishing local or direct wireless communication links with electronic terminal devices, because it was no longer necessary to use special purpose RFID transponders in form of RFID cards, dongles, or the like. However, in order to monitor, maintain, and/or update the electronic terminal devices in the access control systems, there is an increased requirement of providing the electronic terminal devices with communication modules for direct communication with remote back-end systems. Consequently, so called stand-alone or off-line electronic terminal devices without communication links to back-end systems are difficult to maintain and keep up to date with the frequent software upgrades and hardware innovations of mobile phones, in particular, and the short product life cycles customary in the world of consumer electronic products, in general.

SUMMARY OF THE INVENTION

It is an object of this invention to provide an electronic terminal device, a mobile communication device, and a method of communicating between an electronic terminal device and a back-end system, which devices and method do not have at least some of the disadvantages of the prior art. In particular, it is an object of the present invention to provide an electronic terminal device, a mobile communication device, and a method of communicating between an electronic terminal device and a back-end system, without the necessity of the electronic terminal device having a communication module or communication link for direct communication with a remote back-end system.

According to the present invention, these objects are achieved through the features of the independent claims. In addition, further advantageous embodiments follow from the dependent claims and the description.

An electronic terminal device comprises a radio communication module configured to perform a bidirectional wireless data exchange with a mobile communication device over a direct wireless communication link between the radio communication module and the mobile communication device, and a controller connected to the wireless radio communication module.

According to the present invention, the above-mentioned objects are particularly achieved in that the controller of the electronic terminal device is configured to generate a terminal report message, and to transmit the terminal report message via the direct wireless communication link to the mobile communication device. The terminal report message includes a message content part and a message addressing part. The message addressing part is configured to enable the mobile communication device to determine from the addressing part a remote message processing system for forwarding the message content part of the terminal report message to a back-end system assigned to the electronic terminal device.

In an embodiment, the controller is configured to generate the terminal report message in response to an authorization code received by the radio communication module via the direct wireless communication link from the mobile communication device.

In an embodiment, the controller is configured to determine from the authorization code affirmative or negative access authorization, and to include the access authorization in the message content part of the terminal report message.

In an embodiment, the controller is further configured to monitor operational parameters of the electronic terminal device, and to include the operational parameters in the message content part of the terminal report message.

In an embodiment, the electronic terminal device comprises a battery, and the controller is further configured to monitor a battery level, and to include the battery level in the message content part of the terminal report message.

In an embodiment, the electronic terminal device comprises an electronic lock, and the controller is connected to the electronic lock and further configured to control the electronic lock to perform an unlocking operation, to count the number of unlocking operations, and to include the number of unlocking operations in the message content part of the terminal report message.

In an embodiment, the controller is configured to encrypt the message content part of the terminal report message using an encryption algorithm that requires for its decryption a secret of the back-end system assigned to the electronic terminal device.

In an embodiment, the controller is configured to include in the message addressing part of the terminal report message addressing or identification information of the back-end system.

In an embodiment, the controller is configured to include in the message addressing part of the terminal report message addressing or identification information of a remote message center.

In an embodiment, the controller is configured to include in the message content part of the terminal report message a device identifier of the electronic terminal device.

In an embodiment, the controller is configured to include in the terminal report message a text.

In addition to the electronic terminal device, the present invention also relates to a mobile communication device which comprises a telecommunication module configured to communicate via a telecommunications network with remote computer systems. The mobile communication device further comprises a radio communication module configured to perform a bidirectional wireless data exchange with an electronic terminal device over a direct wireless communication link between the electronic terminal device and the radio communication module. The mobile communication device further comprises a processor connected to the telecommunication module and the radio communication module. The processor is configured to analyze a message addressing part included in a terminal report message received from the electronic terminal device, to determine from the message addressing part a remote message processing system for forwarding a message content part of the terminal report message to a back-end system assigned to the electronic terminal device, to generate and transmit via the telecommunications network to the remote message processing system a forwarding message, the forwarding message including the message content part of the terminal report message and a forwarding message addressing part configured to enable the remote message processing system to transfer the message content part of the terminal report message to the back-end system assigned to the electronic terminal device.

In an embodiment of the mobile communication device, the processor is further configured to transmit an authorization code via the direct wireless communication link to the electronic terminal device, and to receive the terminal report message from the electronic terminal device in response to the authorization code.

In an embodiment of the mobile communication device, the processor is further configured to include in the forwarding message identification information enabling identification of a user linked to the mobile communication device.

In an embodiment of the mobile communication device, the processor is further configured to include the authorization code in the forwarding message.

In an embodiment of the mobile communication device, the processor is further configured to show on a display of the mobile communication device a text message included in the received message.

In an embodiment of the mobile communication device, the processor is further configured to receive from the remote message processing system a back-end response, in response to transmitting the forwarding message to the remote message processing system, and to transmit the back-end response via the direct wireless communication link to the electronic terminal device, in response to receiving the terminal report message received from the electronic terminal device.

In addition to the electronic terminal device and the mobile communication device, the present invention also relates to a method of communicating between an electronic terminal device and a back-end system assigned to the electronic terminal device. The method comprises: generating in the electronic terminal device a terminal report message, the terminal report message including a message content part and a message addressing part; transmitting the terminal report message from the electronic terminal device via a direct wireless communication link between the electronic terminal device and a mobile communication device to the mobile communication device; determining in the mobile communication device from the addressing part of the terminal report message a remote message processing system for forwarding the terminal report message; generating in the mobile communication device a forwarding message, the forwarding message including the message content part of the terminal report message and a forwarding message addressing part; transmitting the forwarding message from the mobile communication device via a telecommunications network to the remote message processing system; determining in the remote message processing system from the forwarding message addressing part the back-end system assigned to the electronic terminal device; and transferring the message content part of the terminal report message from the remote message processing system to the back-end system.

In an embodiment, the method further comprises receiving in the electronic terminal device an authorization code from the mobile communication device via the direct wireless communication link, and generating the terminal report message in the electronic terminal device in response to the authorization code.

In an embodiment, the method further comprises receiving in the mobile communication device a back-end response from the remote message processing system, in response to transmitting the forwarding message to the remote message processing system; and transmitting the back-end response via the direct wireless communication link to the electronic terminal device, in response to receiving the terminal report message received from the electronic terminal device.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
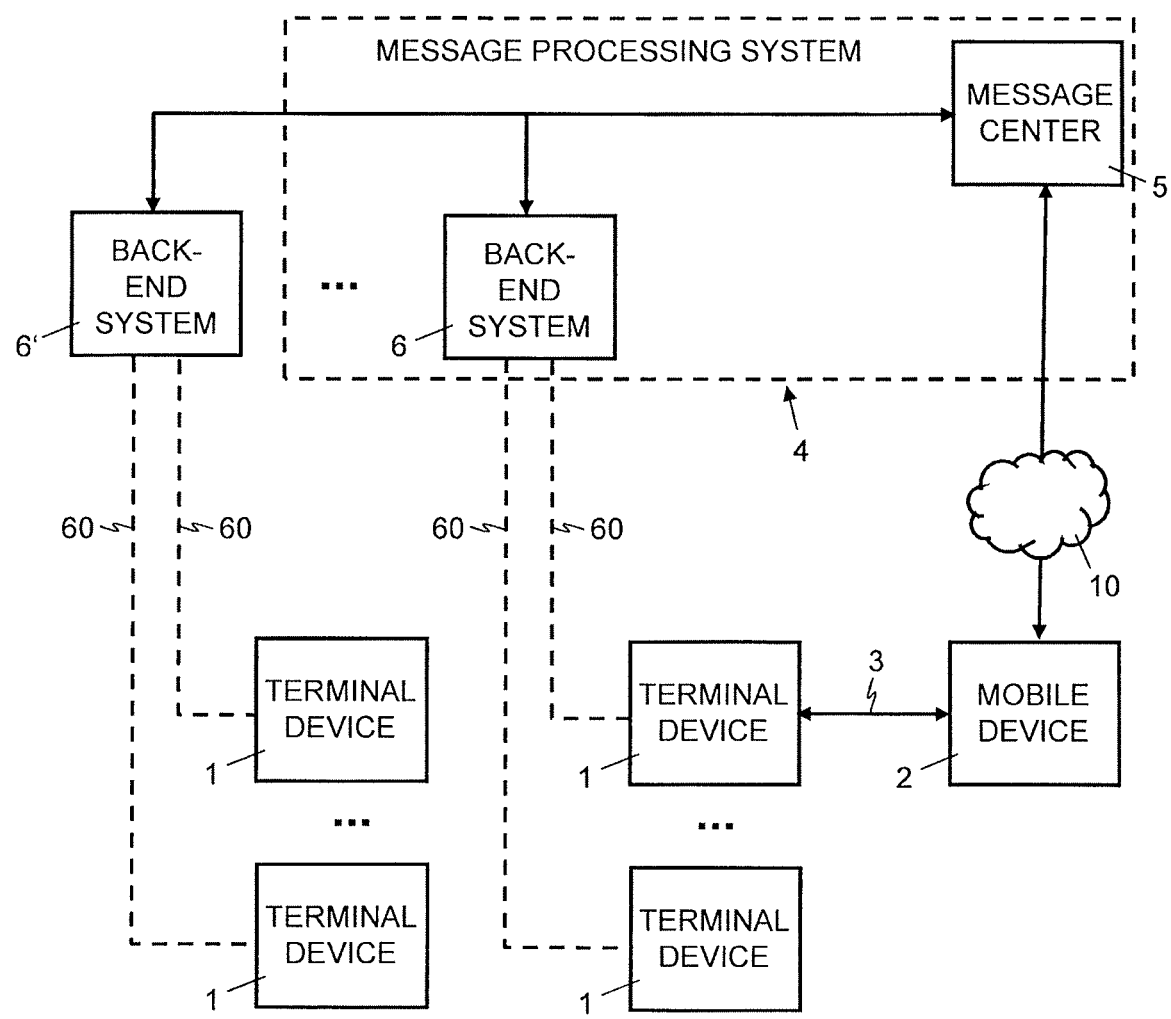
FIG. 1: shows a block diagram illustrating schematically electronic terminal devices which communicate with assigned back-end systems via a mobile communication device.

FIG. 1 shows a communication system comprising electronic terminal devices 1, a mobile communication device 2, and a message processing system 4. The message processing system 4 comprises a message center 5 and one or more back-end systems 6, 6'. Reference numeral 6' refers to a customer back-end system, arranged separately and remote from the back-end systems 6 arranged with the message center 5. The message center 5 and the back-end systems 6, 6' are implemented on one or more operable computers of the message processing system 4. Depending on the implementation and configuration, the message center 5 is configured to communicate with the back-end systems 6, 6' via a communication bus, a local area network, or a telecommunication network, e.g. via the Internet. As is further illustrated in FIG. 1, the mobile communication device 2 comprises a telecommunication module 23 configured to communicate with the message center 5 via telecommunications network 10. The telecommunications network 10 comprises a mobile radio network, such as GSM (Global System for Mobile Communication), UMTS (Universal Mobile Telephone System) or the like. As indicated by dashed lines in FIG. 1, optionally, the electronic terminal devices 1 are connected through communication links 60 to an assigned back-end system 6, 6', e.g. through wire connections or fixed or mobile communication network. However, stand-alone or off-line embodiments of the electronic terminal devices 1 are not provided with a direct communication link 60 to a back-end system 6, 6'. Moreover, for mobile embodiments of the electronic terminal devices 1 permanent availability of a direct communication link 60 to a back-end system 6, 6' cannot be guaranteed, e.g. when they are located in an area without reception.

The mobile communication device 2 is implemented as a mobile radio telephone (i.e. a cellular phone), a tablet or notebook computer, a computerized watch, or another mobile communication device. As illustrated schematically in FIG. 1, the mobile communication device 2 comprises a radio communication module 21 and a programmable processor 22 connected thereto. The radio communication module 21 is configured to exchange data with the radio communication module 11 of the electronic terminal device 1 via the direct wireless communication link 3.

Figure 2:
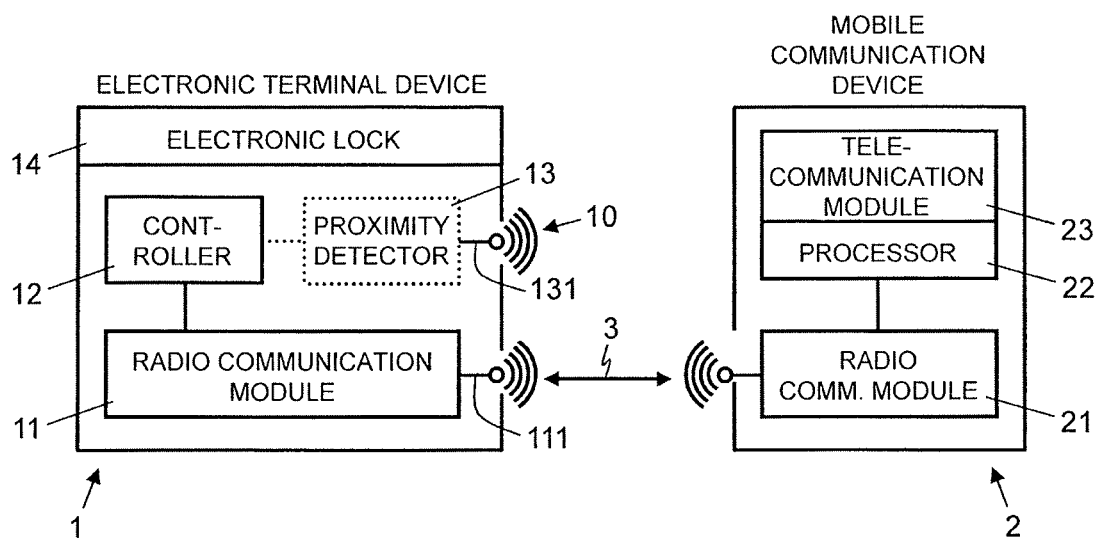
FIG. 2: shows a block diagram illustrating schematically an electronic terminal device with a radio communication module and a radio based proximity detector.

As is illustrated schematically in the embodiment of FIG. 2, the electronic terminal device 1 is implemented as an electronic access control device which comprises an electronic/electric lock 14 for locking and unlocking an entrance, such as a door, a gate or the like, to an access controlled area, such as a building, a car, or a room. Responsive to an access control signal, the electronic lock 14 drives one or more bars or bolts to lock or unlock an entrance to the access controlled area. The electronic lock 14 is implemented together with the remaining components of the electronic access control device 1 in a common housing or in separate housings. One skilled in the art will understand that depending on the application, e.g. to control access to objects in a vending machine, the electronic terminal device 1 or the electronic lock 14, respectively, are configured accordingly to block or grant access, e.g. to unlock or deliver objects in or from a vending machine.

In alternative embodiments, the electronic terminal device 1 is not configured to lock and unlock an entrance but is configured to control user access to areas, objects, or services that traditionally required a ticket, e.g. public transportation, such as a train, tram, boat, ski lift, etc., or to events, such as performances in theatres, cinemas, sports arenas, etc., or access to objects supplied by a vending machine, such as a food, drink, or snack dispenser. Accordingly, a user's respective access rights are represented by an authorization code comprising an electronic (cryptographic) access key, an electronic ticket, and/or electronic funds or vouchers.

The electronic terminal device 1 comprises one or more electronic circuits and modules powered by one or more batteries or an external power supply connected to the electronic terminal device 1. As is shown in FIG. 2, the electronic terminal device 1 comprises a radio communication module 11, a controller 12, and an optional proximity detector 13. The controller 12 is electrically connected to the communication module 11 and the proximity detector 13.

The radio communication module 11 is configured to perform a wireless data exchange with a mobile communication device 2 over a direct wireless communication link 3 between the radio communication module 11 and the mobile communication device 2. The term "direct" is to indicate that the wireless communication link 3 includes no intermediate components, such as routers, repeaters, gateways, wire networks, base stations, etc., between the radio communication module 11 and the mobile communication device 2. The radio communication module 11 is configured to perform the wireless data exchange over a short distance of several meters, particularly over a distance of up to five, ten, or twenty meters. In an embodiment, the radio communication module 11 comprises a Bluetooth transceiver, specifically a Low Energy Bluetooth transceiver. The radio communication module 11 is configured to operate in a frequency band from 2.4 to 2.485 GHz, using (Ultra High Frequency UHF) microwaves. In an alternative embodiment, the radio communication module 11 comprises a WLAN communication module based on IEEE 802.11 standards, e.g. operating in a frequency band from 2.4 GHz to 5 GHz. In yet another embodiment, the radio communication module 11 comprises RFID communication module in accordance with ISO 18092, ISO 21481, ISO 15693, and/or ISO 14443, e.g. operating at a carrier frequency of 6.78 MHz, 13.56 MHz, or 27.12 MHz (or another multiple of 13.56 MHz), using (High Frequency HF) radio waves.

The controller 12 comprises a programmable microprocessor with computer program code, a field programmable gate array, an application specific integrated circuit, and/or another electronic circuit configured to execute various functions, as described later in more detail.

The optional proximity detector 13 is configured to detect the presence of a mobile communication device 2 in a defined proximity of the electronic access control device 1, specifically, in close proximity within a distance range of up to five, ten, or fifteen centimeters, e.g. adjustable by setting a sensitivity parameter in the access control device 1. Depending on the embodiment, the proximity detector 13 comprises a non-radio-based proximity detector and/or a radio-based proximity detector. The non-radio based proximity detector is configured to detect the presence of the user without using radio waves. The non-radio-based proximity detector includes one or more non-radio-based detector modules, including a capacitive sensor, a photo detector, a motion detector, a shock detector, and/or an electromechanical switch. The radio-based proximity detector includes a continuous wave radar system or a reader wake-up module as disclosed in patents EP 1 723 575 or EP 2 437 403 in the name of the applicant, the full contents of which being incorporated herein by reference. The reader wake-up module is configured to detect the presence of a mobile communication device 2 by emitting an electromagnetic field pulse 10, by detecting a return signal during emission of the electromagnetic field pulse 10, and using the return signal to detect the presence of the mobile communication device 2.

Figure 4:
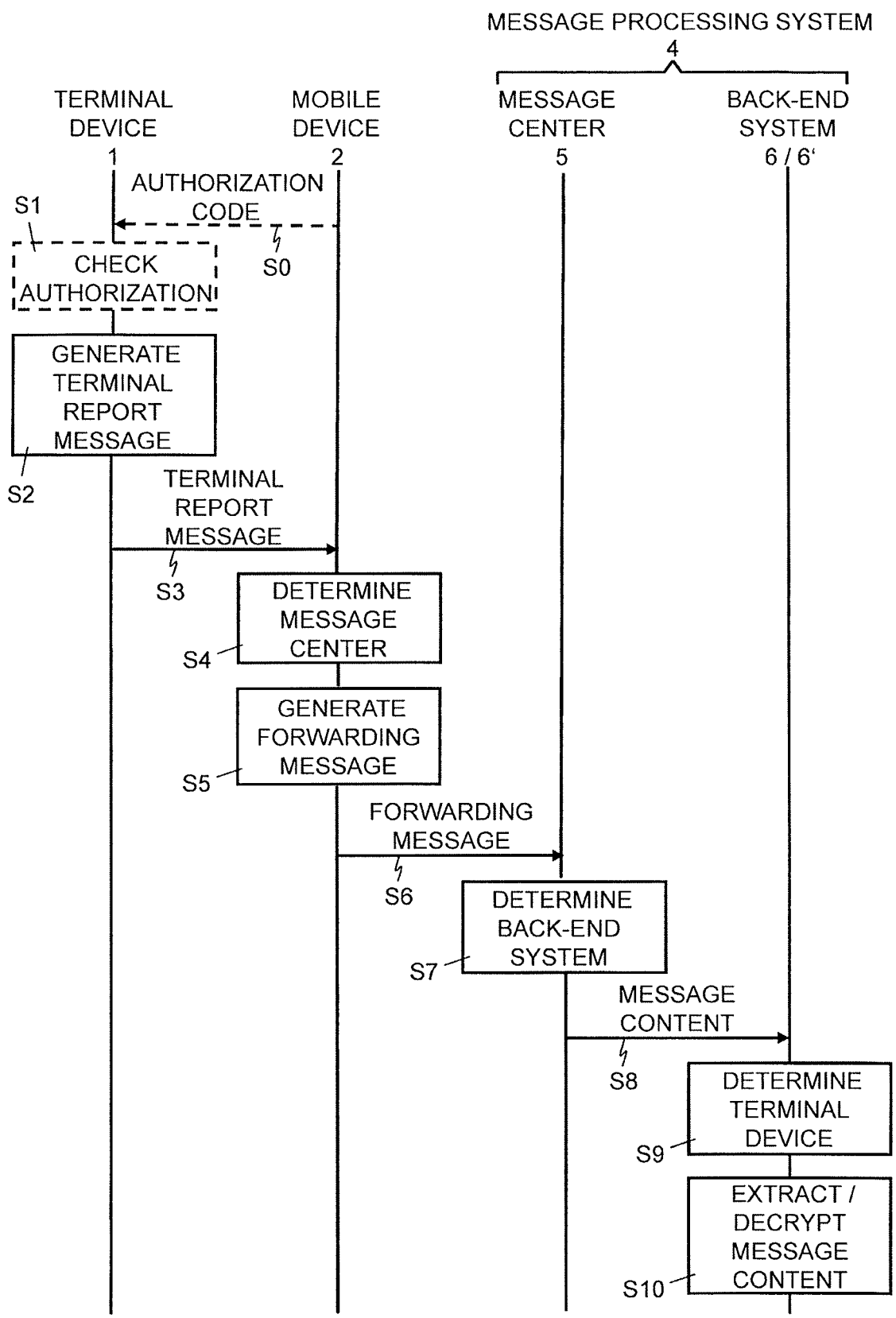
FIG. 4: shows a flow diagram illustrating an exemplary sequence of steps for transmitting a terminal report message to a back-end system.
Figure 5:
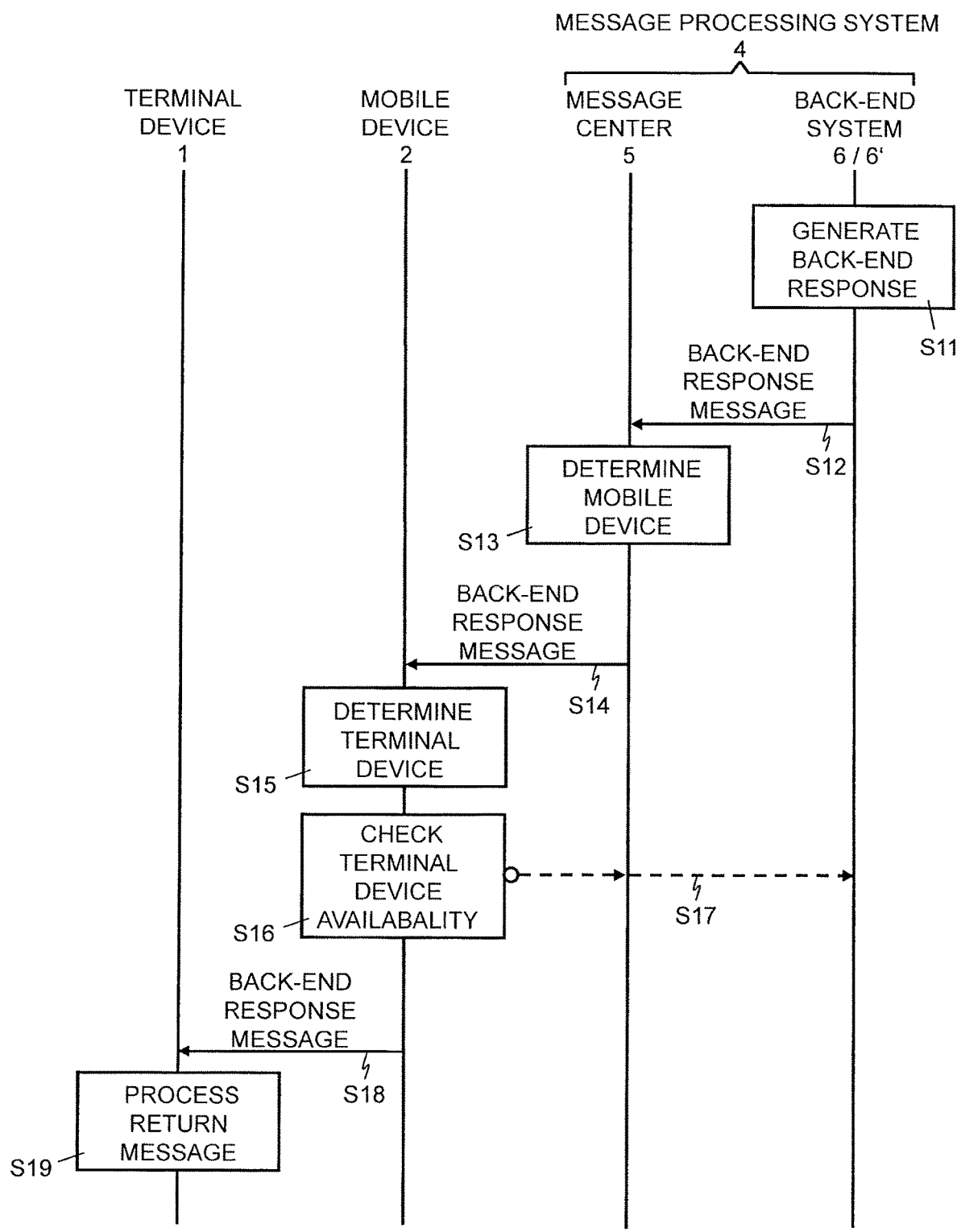
FIG. 5: shows a flow diagram illustrating an exemplary sequence of steps for transmitting a back-end response from the back-end system to the electronic terminal device.

In the following paragraphs, described with reference to FIGS. 4 and 5 are possible sequences of steps for exchanging messages between an electronic terminal device 1 and a back-end system 6, 6', particularly between a stand-alone or off-line electronic terminal device 1 and a back-end system 6, 6'. Steps S0 to S10 relate to transmitting a terminal report message 7 from the electronic terminal device 1 to a back-end system 6, 6' assigned to the electronic terminal device 1. Steps S11 to S19 relate to transmitting a back-end response message from the back-end system 6, 6' to the electronic terminal device 1.

In initiating steps, the electronic terminal device 1 or its proximity detector 13, respectively, detects the presence of the mobile communication device 2 in defined (close) proximity of the electronic terminal device 1. For that purpose, the user of the mobile communication device 2 physically moves and places the mobile communication device 2 into the defined (close) proximity range of the electronic terminal device 2 or the antenna 131 of its proximity detector 13, respectively, or, in accordance with other embodiments of the proximity detector 13, the user performs other maneuvers to indicate proximity, such as knocking on a door to activate the shock detector, perform a hand movement to activate the motion detector, touch a door handle to activate the capacitive sensor, activate the electromechanical switch, etc.

Upon detection of the mobile communication device 2 in defined (close) proximity to the electronic terminal device 1 or its proximity detector 13, respectively, the controller 12 of the access control device 1 controls the radio communication module 11 to establish a direct wireless communication link 3 with the mobile communication device 2.

One skilled in the art will understand, however, that the below described method of exchanging messages between the electronic terminal device 1 and a back-end system 6, 6' does not require the optional proximity detector 13 and the detection of the mobile communication device 2 in defined (close) proximity for setting up and establishing the direct wireless communication link 3 between the mobile communication device 2 and the electronic terminal device 1. For the purpose of exchanging messages between the electronic terminal device 1 and a back-end system 6, 6', the direct wireless communication link 3 can be setup between the respective radio communication modules 11, 21, without prior proximity detection by a proximity detector.

In step S0, once the direct wireless communication link 3 is set up between the mobile communication device 2 and the electronic terminal device 1 or their radio communication modules 11, 21, respectively, the mobile communication device 2 or its radio communication module 21, respectively, transfers an authorization code via the direct wireless communication link 3 to the electronic terminal device 1. Specifically, the processor 22 of the mobile communication device 2 is configured to transfer the authorization code to the electronic terminal device 1. Transmission of the authorization code is triggered once the direct wireless communication link 3 is set up between the mobile communication device 2 and the access control device 1 or their radio communication modules 11, 21, respectively. In an embodiment, transmission of the authorization code is triggered by the electronic terminal device 1 transmitting an execution request via the direct wireless communication link 3 to the mobile communication device 2. The authorization code authorizes the mobile communication device 2 to operate as a communication relay between the electronic terminal device 1 and the back-end system 6, 6' assigned to the electronic terminal device 1. Depending on the application and/or configuration, e.g. in embodiments where the electronic terminal device 1 is configured as an access control device, the authorization code further authorizes the user of the mobile communication device 2 to access the access controlled area, service or product, as described above.

In step S1, the electronic terminal device 1 or its controller 12, respectively, determines from the authorization code affirmative or negative access authorization. Specifically, an authorization code that is positively verified indicates affirmative authorization for exchanging messages with the back-end system 6, 6' assigned to the electronic terminal device 1.

One skilled in the art will understand, however, that the below described method of exchanging messages between the electronic terminal device 1 and a back-end system 6, 6' does not require the transmission and checking of an authorization code in steps S0 and S1, if any appropriately configured mobile communication device 2 is permitted to operate as a communication relay between the electronic terminal device 1 and the back-end system 6, 6' assigned to the electronic terminal device 1.

In an embodiment, the authorization code further comprises a request code which indicates a specific data request to be executed and responded to by the electronic terminal device 1.

Figure 3:
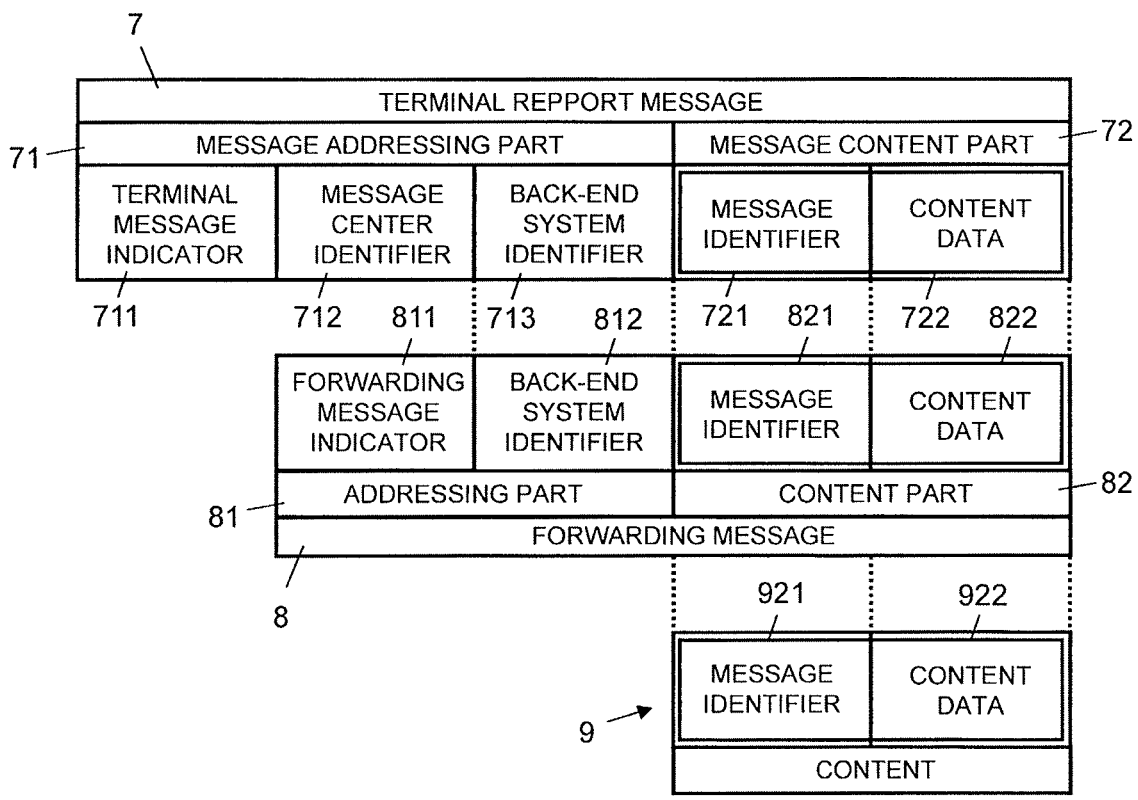
FIG. 3: shows a block diagram illustrating schematically data structures of a terminal report message and a forwarding message.

In step S2, if applicable upon positive verification of the authorization code, the electronic terminal device 1 or its controller 12, respectively, generates a terminal report message 7. As illustrated in FIG. 3, the terminal report message comprises a message content part 72 and a message addressing part 71. The message content part 72 comprises a message identifier 721 and content data 722. The message identifier 721 includes an electronic terminal device identifier 721 that unambiguously identifies the electronic terminal device 1 and a sequence number generated by the electronic terminal device 1 or its controller 12, respectively. The message addressing part 71 comprises a terminal message indicator 711, a message center identifier 712, and a back-end system identifier 713. The terminal message indicator 711 identifies the message type as "terminal report message". The message center identifier 712 includes identification and/or addressing information and unambiguously identifies and/or addresses the message center 5 responsible for processing the terminal report message 7. The back-end system identifier 713 includes identification and/or addressing information and unambiguously identifies and/or addresses the back-end system 6, 6' assigned to the electronic terminal device 1.

The content data 722 includes operational parameters of the electronic terminal device 1. The operational parameters include operational conditions monitored by the electronic terminal device 1 or its controller 12, respectively. Depending on the embodiment and configuration, the operational parameters include the battery level of a battery of the electronic terminal device 1, the number of unlocking operations performed by an electronic lock 14 of the electronic terminal device 1, and/or other state/condition data of the electronic terminal device 1. In an embodiment, the content data 722 further includes a time stamp and configuration parameters of the electronic terminal device 1, such as version numbers of software and/or hardware of the electronic terminal device 1. In a further embodiment, the content data 722 includes a text message. In yet a further embodiment, the content data 722 includes the affirmative access authorization, e.g. in form of an electronic signature. In a further embodiment, the content data 722 includes response data determined and provided by the electronic terminal device 1 in response and accordance to a request code included in the received authorization code. In a further embodiment, the content data 722 includes an instruction for the back-end system 6, 6' assigned to the electronic terminal device 1, e.g. an update request, a service request, etc.

In step S3, the electronic terminal device 1 or its controller 12, respectively, transmits the terminal report message 7 vie the direct wireless communication link 3 to the mobile communication device 2. In an embodiment, the controller 12 encrypts the message content part 72 prior to its transmission using an encryption algorithm that requires for its decryption a secret of the back-end system 6, 6' assigned to the electronic terminal device 1.

In step S4, the mobile communication device 2 or its processor 22, respectively, extracts from the terminal report message 7 the message center identifier 712 and determines the message center 5 responsible for processing the terminal message 7.

In step S5, the mobile communication device 2 or its processor 22, respectively, generates a forwarding message 8. As illustrated in FIG. 3, the forwarding message 8 comprises a content part 82 and an addressing part 81. The content part 82 comprises the message identifier 821 and the content data 822 extracted from the terminal report message 7. The addressing part 81 comprises a forwarding message indicator 811 and the back-end system identifier 813 extracted from the terminal report message 7. The forwarding message indicator 811 identifies the message type as "forwarding message".

In step S6, the mobile communication device 2 or its telecommunication module 23, respectively, transmits the forwarding message 8 via telecommunications network 10 to the message center 5 identified by the message center identifier 712 extracted from the terminal report message 7. For the purpose of matching and relaying response messages, the mobile communication device 2 stores the forwarding message 8 or at least the message identifier 821, including the sequence number and the electronic terminal device identifier of the originating electronic terminal device 1. In an embodiment, the forwarding message 8 or a communication channel used for transmitting the forwarding message 8 is encrypted.

In step S7, the message center 5 or one of its processors, respectively, extracts from the forwarding message 8 the back-end system identifier 813 and determines the back-end system 6, 6' assigned to the electronic terminal device 1.

In step S8, the message center 5 or one of its processors, respectively, transmits the message content 9 to the back-end system 6, 6' identified by the back-end system identifier 813 extracted from the forwarding message 8. The message content 9 comprises the message identifier 921 and the content data 922 extracted from the content part 82 of the forwarding message 8. For the purpose of matching and relaying response messages, the message center 5 stores the forwarding message 8 or at least the message identifier 821, including the sequence number and the electronic terminal device identifier of the originating electronic terminal device 1, assigned to an address of the originating mobile communication device 2.

In step S9, the back-end system 6, 6' or one of its processors, respectively, extracts from the message identifier 921 the electronic terminal device identifier 921 and determines the originating electronic terminal device 1 that transmitted the terminal report message 7.

In step S10, the back-end system 6, 6' or one of its processors, respectively, extracts and if applicable decrypts the content data 922 received via the mobile communication device 2 and the message center 5 from the originating electronic terminal device 1 identified by the electronic terminal device identifier included in the message identifier 921. The (decrypted) content data 922 is stored by back-end system 6, 6' assigned to the message identifier 921, including the sequence number and the electronic terminal device identifier of the originating electronic terminal device 1.

As illustrated in FIG. 5, in step S11, the back-end system 6, 6' or one of its processors, respectively, generates a back-end response message. The back-end response message includes a content part with a message identifier and content data. The content data includes an acknowledgement of having received the message content 9 from the electronic terminal device 2 identified by the electronic terminal device identifier. In an embodiment, the content data further includes software updates and/or configuration parameters for the electronic terminal device 2. In a further embodiment, the content data further includes a time stamp. Depending on the embodiment or application, the content data further includes responses or results in response to requests or instructions received in the terminal report message 7 from the electronic terminal device 2. The message identifier includes the sequence number and the electronic terminal device of the originating electronic terminal device 1 received in step S8 with the message content 9 from the message center 5. The message identifier further includes the back-end system identifier of the responding back-end system 6, 6' and a sequence number generated by the responding back-end system 6, 6' or one of its processors, respectively. As described below, the back-end response message is relayed via the message center 5 and the mobile communication device 2 to the originating electronic terminal device 1. Thus, the presence and/or availability of a communication link 60 is not necessary.

In step S12, the back-end response message is transmitted from the back-end system 6, 6' to the message center 5, as a response to the message content 9 received in step S8 from the message center 5.

In step S13, the message center 5 or one of its processors, respectively, determines the mobile communication device 2 through which the back-end response message is to be relayed to the originating electronic terminal device 1. For that purpose, the message center 5 uses the message identifier of the terminal report message included in the back-end response message to determine the address of the originating mobile communication device 2 stored in the message center 5.

In step S14, the message center 5 or one of its processors, respectively, forwards the back-end response message to the mobile communication device 2 determined in step S13. In an embodiment, the forwarding message 8 back-end response message or a communication channel used for transmitting the back-end response message is encrypted.

In step S15, the mobile communication device 2 or its processor 22, respectively, determines the electronic terminal device 1 to which the back-end response message is to be forwarded. For that purpose, the mobile communication device 2 uses the electronic terminal device identifier of the originating electronic terminal device 1 included in the message identifier of the back-end response message.

In step S16, the mobile communication device 2 or its processor 22, respectively, checks whether the respective electronic terminal device 1 is still connected or reachable through the direct wireless communication link 3. If this is not the case, the mobile communication device 2 proceeds in step S17 by sending an error report message via the message center 5 to the back-end system 6, 6', indicating that the back-end response message could not be delivered at this point in time. In an embodiment, the mobile communication device 2 delivers the back-end response message at a later point in time to the electronic terminal device 1 when it is connected to and reachable for the mobile communication device 2 (store and forward).

In step S18, the mobile communication device 2 or its processor 22, respectively, uses the radio communication module 21 to transmit the back-end response message to the electronic terminal device 1.

In step S19, the back-end response message is received by the radio communication module 22 of the electronic terminal device 1. The electronic terminal device 1 or its controller 12, respectively, processes the received back-end response message. For example, using the message identifier, the controller 12 matches the received back-end response message to the corresponding terminal report message 7. If there is a match, the terminal report message 7 is considered acknowledged by the back-end system 6, 6', e.g. if the time delay between the terminal report message 7 and the back-end response message is within a defined time threshold value. Depending on the data content included in the back-end response message, further processing steps may be included, e.g. installation of software updates included in the data content.

It should be noted that, in the description, the sequences of the steps have been presented in a specific order, one skilled in the art will understand, however, that the computer program code may be structured differently and that the order of at least some of the steps could be altered, without deviating from the scope of the invention.

The invention claimed is:

1. An electronic terminal device comprising a radio communication module configured to perform a bidirectional wireless data exchange with a mobile communication device over a direct wireless communication link between the radio communication module and the mobile communication device, and a controller connected to a wireless radio communication module, wherein the controller comprises an electronic circuit configured to generate a terminal report message, and to transmit the terminal report message via the direct wireless communication link to the mobile communication device, the terminal report message generated by the controller including a message content part and a message addressing part, the message addressing part comprising a message center identifier that identifies a message center of a remote message processing system responsible for processing the terminal message and enables the mobile communication device to use the message addressing part for forwarding the message content part of the terminal report message to a back-end system assigned to the electronic terminal device.

2. The electronic terminal device of claim 1, wherein the controller is configured to generate the terminal report message in response to an authorization code received by the radio communication module via the direct wireless communication link from the mobile communication device.

3. The electronic terminal device of claim 1, wherein the controller is further configured to monitor operational parameters of the electronic terminal device, and to include the operational parameters in the message content part of the terminal report message.

4. The electronic terminal device of claim 1, wherein the electronic terminal device comprises a battery, and the controller is further configured to monitor a battery level, and to include the battery level in the message content part of the terminal report message.

5. The electronic terminal device of claim 1, wherein the electronic terminal device comprises an electronic lock, and the controller is connected to the electronic lock and further configured to control the electronic lock to perform an unlocking operation, to count the number of unlocking operations, and to include the number of unlocking operations in the message content part of the terminal report message.

6. The electronic terminal device of claim 1, wherein the controller is configured to encrypt the message content part of the terminal report message using an encryption algorithm that requires for its decryption a secret of the back-end system assigned to the electronic terminal device.

7. The electronic terminal device of claim 1, wherein the controller is configured to include in the message addressing part of the terminal report message addressing or identification information of the back-end system.

8. The electronic terminal device of claim 1, wherein the controller is configured to include in the message addressing part of the terminal report message addressing or identification information of a remote message center.

9. The electronic terminal device of claim 1, wherein the controller is configured to include in the message content part of the terminal report message a device identifier of the electronic terminal device.

10. The electronic terminal device of claim 1, wherein the controller is configured to include in the terminal report message a text.

11. A mobile communication device comprising a telecommunication module configured to communicate via a telecommunications network with remote computer systems, and a radio communication module configured to perform a bidirectional wireless data exchange with an electronic terminal device over a direct wireless communication link between the electronic terminal device and the radio communication module; and a processor connected to the telecommunication module and the radio communication module;
wherein the processor is configured 1) to analyze a message addressing part included in a terminal report message received from the electronic terminal device, the message addressing part having a message center identifier that identifies a message center of a remote message processing system responsible for processing the terminal message, 2) to determine from the message addressing part the message center of the remote message processing system for forwarding a message content part of the terminal report message to a back-end system assigned to the electronic terminal device, 3) to generate and transmit via the telecommunications network to the remote message processing system a forwarding message, the forwarding message including the message content part of the terminal report message and a forwarding message addressing part configured to enable the remote message processing system to transfer the message content part of the terminal report message to the back-end system assigned to the electronic terminal device.

12. The mobile communication device of claim 11, wherein the processor is further configured to transmit an authorization code via the direct wireless communication link to the electronic terminal device, and to receive the terminal report message from the electronic terminal device in response to the authorization code.

13. The mobile communication device of claim 11, wherein the processor is further configured to include the authorization code in the forwarding message.

14. The mobile communication device of claim 11, wherein the processor is further configured to show on a display of the mobile communication device a text message included in the received message.

15. The mobile communication device of claim 11, wherein the processor is further configured to receive from the remote message processing system a back-end response, in response to transmitting the forwarding message to the remote message processing system; and to transmit the back-end response via the direct wireless communication link to the electronic terminal device, in response to receiving the terminal report message received from the electronic terminal device.

16. A method of communicating between an electronic terminal device and a back-end system assigned to the electronic terminal device, the method comprising:
generating in the electronic terminal device, a terminal report message, the terminal report message including a message content part and a message addressing part with a message center identifier that identifies a message center of a remote message processing system responsible for processing the terminal message;
transmitting the terminal report message from the electronic terminal device via a direct wireless communication link between the electronic terminal device and a mobile communication device to the mobile communication device;
determining in the mobile communication device from the addressing part of the terminal report message the message center of the remote message processing system for forwarding the terminal report message;
generating in the mobile communication device a forwarding message, the forwarding message including the message content part of the terminal report message and a forwarding message addressing part;
transmitting a forwarding message from the mobile communication device via a mobile radio network to the remote message processing system;
determining in the remote message processing system from the forwarding message addressing part the back-end system assigned to the electronic terminal device; and
transferring the message content part of the terminal report message from the remote message processing system to the back-end system.

17. The method claim of 16, further comprising receiving in the electronic terminal device an authorization code from the mobile communication device via the direct wireless communication link, and generating the terminal report message in the electronic terminal device in response to the authorization code.

18. The method claim of claim 16, further comprising receiving in the mobile communication device a back-end response from the remote message processing system, in response to transmitting the forwarding message to the remote message processing system; and transmitting the back-end response via the direct wireless communication link to the electronic terminal device, in response to receiving the terminal report message received from the electronic terminal device.

* * * * *